United States Patent [19]

Schmuter

[11] Patent Number: 4,999,785

[45] Date of Patent: Mar. 12, 1991

[54] METHOD AND APPARATUS FOR EVALUATING DEFECTS OF AN OBJECT

[75] Inventor: Samson L. Schmuter, New York, N.Y.

[73] Assignee: Robotic Vision Systems, Inc., Hauppauge, N.Y.

[21] Appl. No.: 296,481

[22] Filed: Jan. 12, 1989

[51] Int. Cl.$^5$ ............................................. G06F 15/46
[52] U.S. Cl. ....................................... 364/507; 382/8; 364/552
[58] Field of Search ............... 364/507, 552, 489, 133, 364/131, 506, 550; 356/237; 358/106; 382/8

[56] References Cited

U.S. PATENT DOCUMENTS

| | | | |
|---|---|---|---|
| 4,587,617 | 5/1986 | Barker et al. | 364/507 |
| 4,667,231 | 5/1987 | Pryor | 356/237 |
| 4,677,473 | 6/1987 | Okamoto et al. | 382/8 |
| 4,772,125 | 9/1988 | Yoshimura et al. | 358/106 |
| 4,809,308 | 2/1989 | Adams et al. | 378/99 |
| 4,817,184 | 3/1989 | Thomason et al. | 382/8 |
| 4,866,614 | 9/1984 | Tam | 364/507 |
| 4,916,629 | 4/1990 | Boyue et al. | 364/507 |

FOREIGN PATENT DOCUMENTS 0008707  1/1985  Japan .................................. 358/106

Primary Examiner—Parshotam S. Lall
Assistant Examiner—Michael Zanelli
Attorney, Agent, or Firm—Robin, Blecker, Daley & Driscoll

[57] ABSTRACT

Apparatus and method for evaluating the defects in an object wherein data related to the object is processed to develop an indication for each defect in a first group of defects and to further develop a composite indication for the defects in the remaining composite group of defects and wherein, depending upon the level of the composite indication, the data is further processed with respect to the composite group of defects.

22 Claims, 2 Drawing Sheets

METHOD AND APPARATUS FOR EVALUATING DEFECTS OF AN OBJECT

BACKGROUND OF THE INVENTION

This invention relates to an apparatus and method for evaluating the characteristics of an object and, in particular, to a method and apparatus for evaluating object defects utilizing computer processing techniques.

In present day manufacturing, it is often necessary to examine a product to assess whether the characteristics of the product deviate from desired or ideal characteristics. These deviations can be characterized as defects and when the defects either individually or as a composite exceed certain levels the product may be rejected.

A particular example of this type of evaluation is in the manufacture of printed circuit boards and specifically in evaluating the characteristics of the solder joints used on such boards. In solder joint inspection, the solder joints are examined for a variety of defects ranging from the overall joint shape to local abnormalities such as peaks or holes which might be in the range of 0.001" to 0.002" in size.

In order to be able to resolve solder joint defects of this small size and to also be able to cover the entire range of defect types, some 10,000 data points of each joint may have to be evaluated. In conventional processing of this data with standard image recognition techniques, the presence or absence of all defects of interest would be sequentially identified, one by one. However, following this procedure with such a large number of data points would be very time consuming. In particular, it has been experimentally determined that when using this processing to evaluate a surface mount solder joint for a flat pack, the processing time takes as much as a minute or more.

In high volume production, this amount of processing time per solder joint is intolerably high. As a result, a processing procedure which significantly reduces this time would be highly desirable.

It is therefore, an object of the present invention to provide an improved method and apparatus for evaluating the defects in an object.

It is a further object of the present invention to provide an improved method and apparatus for evaluating the defects in solder joints.

It is yet a further object of the present invention to provide a method and apparatus for evaluating the defects in an object and, in particular, a solder joint, in a reduced amount of time.

SUMMARY OF THE INVENTION

In accordance with the principles of the present invention, the above and other objectives are realized in a practice of evaluating an object for defects, wherein data related to the object is processed to develop an indication for each defect in a first group of the defects and to further develop a composite indication for the defects in the remaining composite group of the defects and wherein, depending upon the level of the composite indication, such data are then further processed in respect of the composite group of defects. Thus, in accordance with the practice of the invention, processing is achieved with a high degree of efficiency by recognizing when additional processing is not needed and the unneeded processing is not performed.

In practice under the present invention, the further processing of the composite group of defects is such as to develop an indication of one or more defects of the group and may include determining a composite indication for a subsequent remaining composite group of defects for still further processing. Also, in practice under the invention, the processing procedure may additionally include determining certain shape geometry attributes of the object. These attributes can then be used to develop the indications for the first group of defects as well as the composite indication for the composite group of defects.

In still a further aspect of the invention, additional processing may be carried out where further processing of a defect in the composite group results in an indication which is inconsistent with the composite indication.

In the illustrative embodiment of the invention discussed below, the object is a solder joint and the defects in the first group relate to the shape of the joint and the defects in the composite group relate to the surface of the joint.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
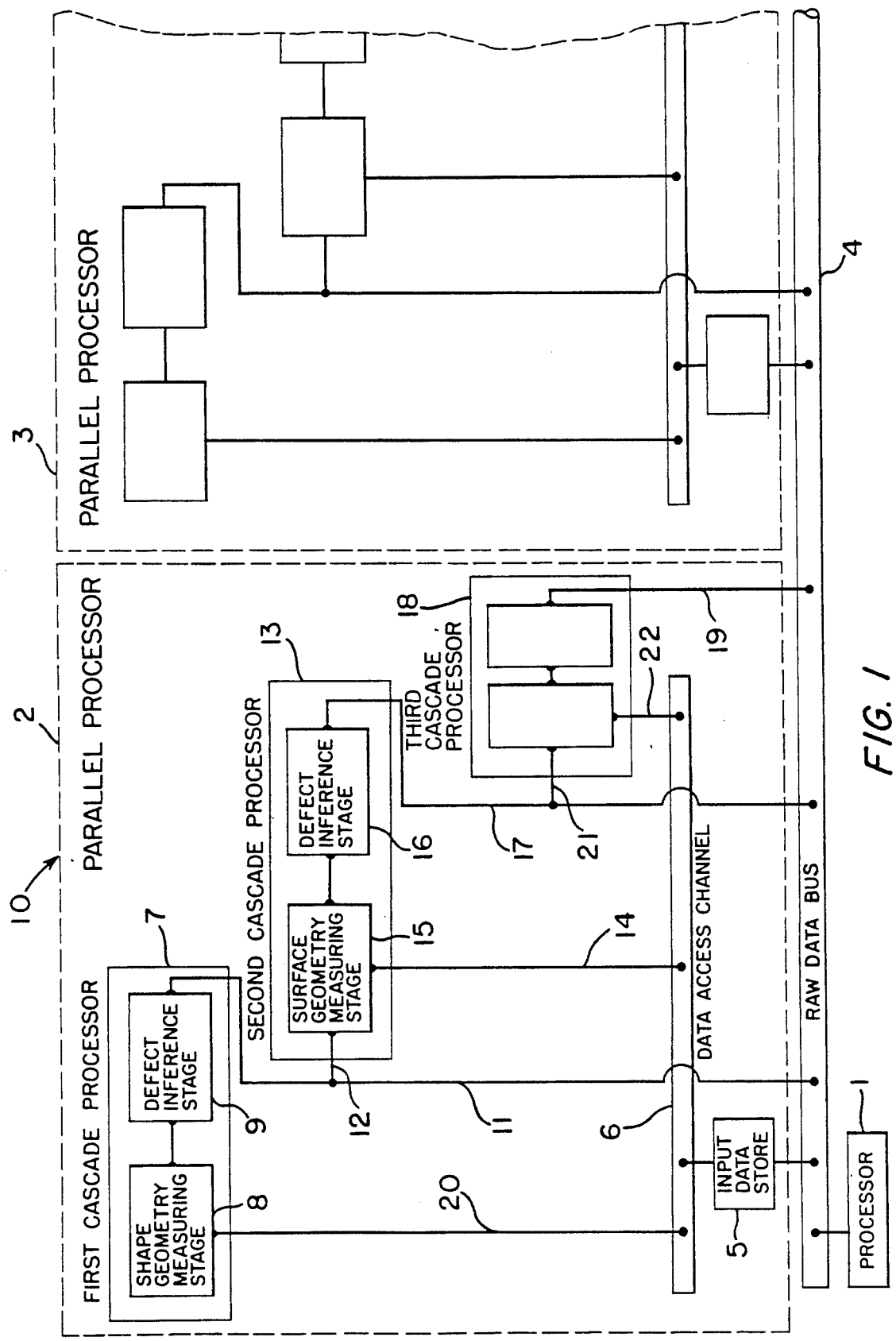
FIG. 1 shows a block diagram of a system embodying the principles of the present invention.

FIG. 1 shows schematically a processing system 10 in accordance with the principles of the present invention. In the present illustrative case, the system 10 is to be used to evaluate the defects in solder joints such as, for example, the printed circuit board solder joint shown in FIG. 2.

A sensor and data acquisition processor 1 scans the printed circuit board and generates three dimensional data points for a number of joints (like the joint of FIG. 2) on the board. The processor 1 partitions this data into blocks containing all the data for a single solder joint, and these blocks of the partitioned data are routed to one of identical, individual parallel joint processors, two such processors 2, 3 being shown, via a raw data/output report routing bus 4. The processors 2, 3, ... operate similarly and, therefore, the following discussion which is directed to the processor 2 also applies to the other processors. Processor 1 attempts to keep all processors 2, 3, ... busy by continually routing blocks of data to them. Of course only one processor 2 is required if it is fast enough.

Within the joint processor 2, the data are positioned in the input data store 5 which is accessed during the processing via a data access channel 6. In the present case, the data processing flow in the processor 2 is functionally partitioned into three cascaded processes carried out by cascade processors 7, 13 and 18.

It should be noted that the cascade processors 7, 13 and 18 need not be separate hardware processors but may represent software modules that are executed in parallel or serially. If executed serially, the processing time speed up is not as great as when processed in parallel, but the method of the invention will still provide a significant reduction in overall processing time because of the reduced amount of processing required as will be disclosed hereinafter. It should also be noted that each cascade processor 7, 13, 18 may be made up of parallel hardware processors or parallel running copies of the software module.

The first cascade processor 7 includes two functional stages. One functional stage is a shape geometry measuring stage 8 and the other a defect inference stage 9.

The measuring stage 8 accesses input data from the access channel 6 via a channel 20. These data are processed by the stage 8 to generate a list of geometric solder joint shape features or attributes which typically might number about 100 features. These generated features or attributes are, in turn, fed into the inference stage 9. The latter performs logic processing of the attributes converted into symbolic symptoms, in such a way that it produces as an output, a list of defects along with their certainty factors. In particular, the output list from the stage 9 includes an individual certainty factor for each defect of a first group of defects. In addition, one lumped or composite criterion or certainty factor is provided for a composite group of defects made up of the remaining defects of the full defect list.

In accord with the invention, the first group of defects involves more general types of characteristics of the solder joint, requiring only the processing of data having a coarser resolution, while the composite group of defects fallS into a class of more detailed characteristics, requiring the processing of data of finer resolution. In the case at hand, the first group of defects is preferably related to the overall shape of the joint and may include defects such as, for example, excessive solder, insufficient solder, bridging, insufficient electrical clearance and absence of a lead. The composite group of defects, in turn, relates to the surface features of the joint and, typically, might include defects such as, dewetting, peaks, bumps, pits and holes.

Once the inference stage 9 develops the list of defects, the continued data processing flow via the cascade processor 7 depends upon the level of the individual certainty factors for the first group' of defects and the level of the composite certainty factor for the composite group. If one or more of the certainty factors for the first group exceed a predetermined level, indicating with high certainty the presence of the defect, the output of the inference stage 9 is fed from the processor 2 via channel 11 to the bus 4. In this case, the outputted data from the system 10 indicate a defective joint and the joint is rejected. Alternatively, the list of defects could be passed on to cascade processor 13 to accumulate additional defects found, if any, by that processor.

In the event that none of the certainty factors, including the composite factor, exceeds a predetermined level, indicating with high certainty that no defect is present, the data processing flow proceeds similarly. Thus, the data is likewise coupled from the processor 2 to the bus 4 via channel 11. However, in this case, the data are outputted from the system 10 with an indication that the joint has no defects and is, therefore, acceptable.

If the composite factor for the composite group exceeds a predetermined level, indicating with some certainty the presence of a defect in the composite group, the output of inference stage 9 is routed by channel 12 to the second cascade processor 13. At this processor, the data are processed again, as discussed in more detail below, to develop certainty factors for the individual defects in the composite group. Meanwhile, cascade processor 7 is free to repeat its processing task on the next joint data stored in the input data store 5.

As can be appreciated, therefore, with such cascaded processing of the invention, only a small percentage or fraction (e.g., below about 5%) of the solder joints being evaluated by the processor 2 (i.e., only those having defects of a second type) will have to undergo processing in the second cascade processor 13. As a result, a significant amount of processing time is saved as compared to the above-discussed more conventional processing procedures which carry out this further processing for all joints. The system of the invention thus allows for higher throughput of joints being evaluated. In fact, the processing in cascade processor 13 can take 20 times as long per joint as cascade processor 7 before slowing down the overall throughput when cascade processor 7 finds an average of 5% percent of the joints must be further processed by cascade processor 13.

As above-noted, the cascade processor 13, receives, via the channel 12, the processed data from the inference stage 9 of the cascade processor 7 when it is determined with some certainty that a defect is present in the composite group. These data and the raw input data, accessed from channel 6, via channel 14, are fed to a surface geometry measuring stage 15 in the cascade processor 13. The stage 15 uses the data to generate a list of geometric surface features or attributes for a potentially defective portion of the solder joint as pointed to by the processed data from the inference stage 9. These surface features or attributes are converted into symbolic symptoms which are then fed into a defect inference stage 16.

In the stage 16, logic processing of the symptoms yields individual certainty factors for each of the defects in the composite group. If these certainty factors confirm with high certainty the existence of a defect, the inference stage 16 output is then fed from the processor 2 to the bus 4 (or as a cumulative defect list to cascade processor 18), which outputs the data with an indication of a defective joint. This is likely to occur in a majority of cases. However, if the certainty factors developed by the inference stage 16 confirm with high certainty that no defect exists, this result contradicts or conflicts with the result arrived at in cascade processor 7.

In order to resolve this conflict a third cascade processor 18 is provided. The cascade 18 receives inference stage 16 output via lines 17 and 21 and the raw data from channel 6 via line 22 and examines the data of finest resolution, but only in the local portion or zone of the joint where there is a conflict, as evidenced and pointed to by the stage 16 output. The cascade 18 processor thus looks in a zoom-like manner into surface features of the local joint zone, and conducts logic processing for this zone to yield an arbitration decision. The cascade 18 either confirms the cascade 13 conclusion of no defects or the cascade 7 conclusion of one or more defects, and in the latter case identifies the defects with certainty factors. The resultant data of the cascade 18 are then routed from the cascade via line 19 to the bus 4, which outputs the data from the system with an indication that the joint is defective or not defective, as determined by the data.

By allowing a somewhat increased false alarm rate at cascade 7 by applying very stringent tolerances on the criteria it examines, and following it with the cascades 13, 18, a more certain detection of all defects will occur. In the jargon of the trade - fewer "escapes" of the defects can be expected to occur. Therefore, in certain situations, data for joints which have been routed to the cascades 7 and 13 and sequentially to cascade 18, will be pronounced as acceptable, thus eliminating the false alarm of the cascade 7.

Since only a small number of the joints processed by cascade processor 13 are expected to be passed on to cascade processor 18, a correspondingly increased amount of processing time may be expended by cascade processor 18 per joint relative to cascade processor 13 without reducing the overall throughput limit established by cascade processor 7.

As above-indicated, cascading of the processing flow in system 10 of the invention, is based upon developing a composite certainty factor for what has been characterized above as the composite or remaining group of defects. As can be appreciated, to benefit from such partitioning, the amount of processing time needed to arrive at the composite certainty factor must be less than the processing time required to evaluate the individual defects of the composite group. In accordance with the invention, this is ensured by developing the composite certainty factor from the same set of attributes or features used to develop the individual certainty factors for the first group of defects. In the present illustrative case, this is accomplished in the cascade stage 7 by using the same shape geometry attributes generated at the stage 8 to develop the individual certainty factors for the first group of defects and to develop the composite certainty factor for the composite group.

Figure 2:
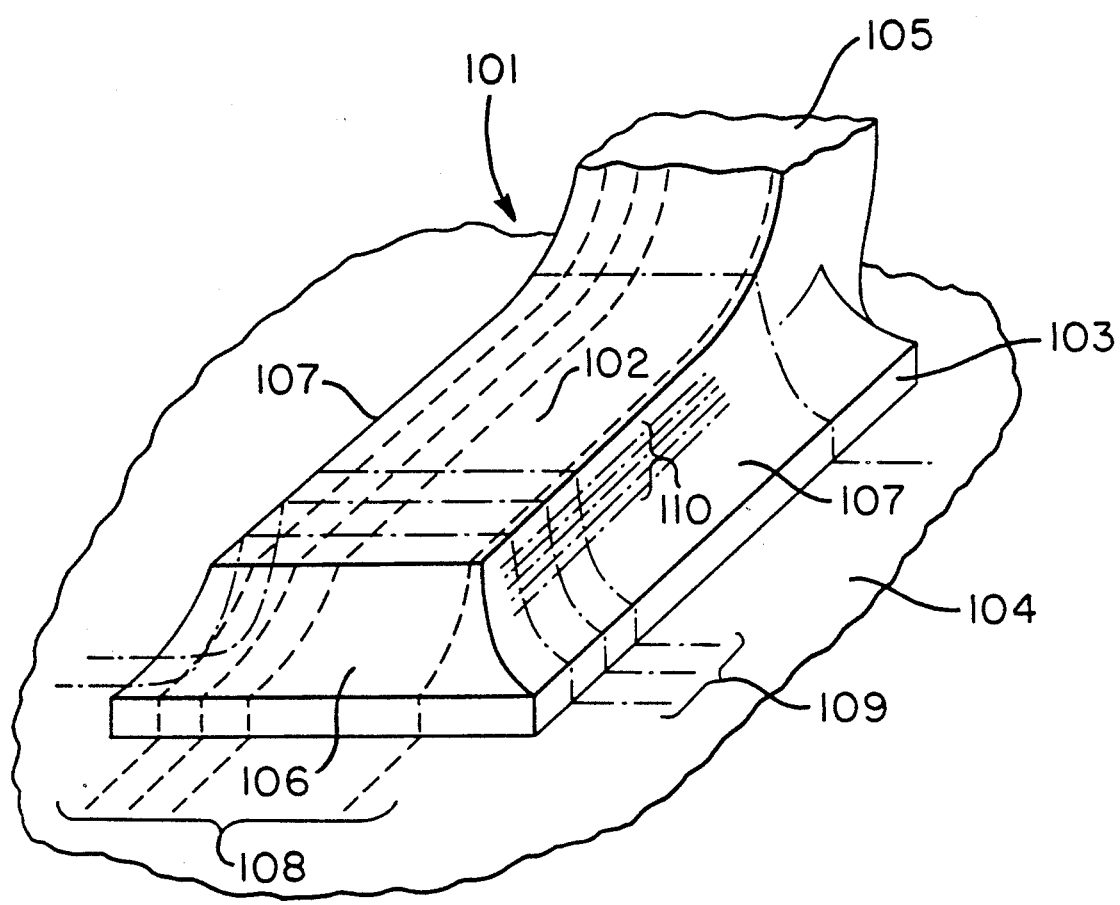
FIG. 2 illustrates a solder joint to be evaluated by the system of FIG. 1.

A discussion of the solder joint of FIG. 2 will illustrate how the raw data from the joint can be partitioned to generate shape attributes which lend themselves to such dual goal processing. In particular, solder joint 101 in FIG. 2 is of the surface mount flat pack type and comprises a lead 102 which is soldered to a pad 103 located on a printed circuit board 104. The joint 101 also includes a riser 105, a toe fillet 106, and side left and right fillets 107.

As above-indicated, the joint 101 can be characterized in terms of three-dimensional data points representative of the entire joint surface. By appropriately accessing and extracting these data points in a certain spacial order, one or more sets of homogeneous cross sections can be extracted in order to characterize the joint shape.

Thus, for example, the set 108 of cross-sections located in a direction from the toe 106 to the riser 105 can be processed to describe the joint shape in the longitudinal direction by measuring toe fillet curvature, slope, corner angle and sharpness, corner height, fillet area, riser start, slope between toe and riser, and a number of other attributes. Averaging of the corresponding attributes between all the cross sections in the set then provides shape features or attributes describing an overall joint shape in this direction. Moreover, some differences between cross section shape attributes indirectly indicate that some surface distortions exist. Thus, the accumulated effect of these differences provides the quantitative factor for the composite certainty factor.

Another set 109 of homogeneous cross-sections located in the direction from the left to the right side fillets 107, can be similarly developed and any substantial deviations from the averaged shape attributes would further contribute to the composite certainty factor. Also, the knowledge of the most substantially contributing regions can be retained as pointers to the most likely place to find defects in the composite group.

By far, the most computationally intensive processing is needed to reduce the raw data set to geometric measurements or attributes, for each individual cross section. Further manipulations with the attributes (e.g. averaging, differentation, etc.) require relatively small computation intensity. Insofar as processing for the composite certainty factor does not require the determination of new attributes, it is accomplished almost at no computation cost.

On the other hand, if the certainty factors for the individual defects in the composite group, i.e., the surface related defects, such as dewetting, peaks, pits, have to be carried out, then this requires extraction of a set of surface profiles from the raw data, similar to a set 110, and processing it for appropriate geometric attritubes such as RMS height, max peak, waviness, etc. This is very computationally intensive processing and would consume a great deal of time.

However, in the present system, as above-described, since the latter type processing is postponed until second cascade 13, which only treats a small percentage of the joints, total computational time is kept at a minimum. Furthermore, processing in cascade 13 is confined to regions where defects are expected as pointed to by the output from the cascade 7. Data not pointed to are not processed, thereby providing an additional savings in processing time. The system of the invention, thus provides an overall efficient technique for evaluating the defects in a solder joint.

Similarly, the additional data processed in cascade processor 18 to obtain the finest resolution makes that computation time per joint even longer than in cascade processor 13. Its total computation time on a whole block of joints, however, is commensurate with that of cascade processors 7 and 13 since only a fraction of the joints processed by cascade processor 13 are passed to cascade processor 18. It should be noted that when parallel processing of the cascade processor 7, 13, 18 functions are performed, the overall computation time will be the shortest when the system is designed to keep each processor actively processing at all times.

It also is within the contemplation of the invention that the cascaded processing in joint processors 2, 3 described for a depth of 3 cascaded stages within each processor, could be extended to a greater depth.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A method of evaluating an object to determine the existence of defects in the object, the method comprising:

processing data related to the object including: developing an indication for each of a first group of said defects, said first group of defects relating to the shape of said object and said indication for each of said first group of defects relating to a measure of the severity of the defect, said developing an indication including partitioning the data per cross-sectional slices of the object, combining corresponding attributes of said cross-sectional slices and developing therefrom said indication for said first group of defects; developing a composite indication for a remaining composite group of said defects, said composite group of defects relating to the surface of said object and said composite indication relating to a measure of the severity of the composite group of defects, said developing a composite indication including comparing attributes of said cross-sectional slices and developing therefrom said composite indication; and determining whether said composite indication exceeds a predetermined level;

and further processing said data with respect to defects in said composite group of defects when said composite indication is determined to exceed said predetermined level.

2. A method in accordance with claim 1 wherein:
said further processing develops an indication for one or more of said defects in said composite group of defects, said indication for each of said one or more defects in said composite group of defects relating to a measure of the severity of the defect.

3. A method in accordance with claim 2 wherein:
said further processing develops an indication for each of said defects in said composite group of defects.

4. A method in accordance with claim 2 wherein:
said further processing further comprises developing a further composite indication for a further remaining composite group of defects, said further composite indication relating to a measure of the severity of the further composite group of defects; determining whether said further composite indication exceeds a further predetermined level; and further processing said data with respect to defects in said further remaining composite group of defects when said further composite indication is determined to exceed said further predetermined level.

5. A method in accordance with claim 2 further comprising:
when the indication developed for a particular defect of said composite group of defects fails to exceed said predetermined level, additionally processing said data to provide a further indication of said particular defect, said further indication relating to a measure of the severity of the particular defect.

6. A method in accordance with claim 1 wherein:
said processing of said data develops shape geometry attributes of the object and the shape geometry attributes are used to develop the indications for each of the defects in said first group and said composite indication.

7. A method in accordance with claim 1 wherein:
said object is a solder joint.

8. A method in accordance with claim 7 wherein:
said first group of defects include: excessive solder, insufficient solder, bridging, insufficient electrical clearance and absence of a lead; and said composite group of defects include: dewetting, peaks, bumps, pits and holes.

9. A method in accordance with claim 1 wherein:
said data comprises three dimensional data related to the object.

10. A method in accordance with claim 1 wherein:
each said indication comprises a certainty factor.

11. A method in accordance with claim 1 wherein:
said further processing of said data with respect to defects in said composite group of defects develops surface geometry attributes of the object and the surface geometry attributes are used to develop an indication for one or more of said defects in said composite group of defects.

12. A method in accordance with claim 1 wherein:
said step of developing a composite indication utilizes at least a part of the processed data generated in the step of developing the indications of the first group of defects.

13. An apparatus for use in evaluating an object to determine the existence of defects in the object, the apparatus comprising:
means for processing data related to the object including: developing an indication for each of a first group of said defects, said first group of defects relating to the shape of said object and said indication for each of said first group of defects relating a ;measure of the severity of the defect, said developing an indication comprising partitioning the data per cross-sectional slices of the object, combining corresponding attributes of said cross-sectional slices and developing therefrom said indications for said first group of defects; developing a composite indication for a remaining composite group of said defects, said composite group of said defects relating to the surface of said object and said composite indication relating to a measure of the severity of the composite group of defects, said developing a composite indication including comparing attributes of said cross-sectional slices and developing therefrom said composite indication; and determining whether said composite indication exceeds a predetermined level;

and further means for processing said data with respect to defects in said composite group of defects when said composite indication is determined to exceed said predetermined level.

14. An apparatus in accordance with claim 13 wherein:
said further means for processing develops an indication for one or more of said defects in said composite group of defects, said indication for each of said one or more defects relating to a measure of the severity of the defect.

15. An apparatus in accordance with claim 14 wherein:
said further means for processing develops an indication for each of said defects in said composite group of defects.

16. An apparatus in accordance with claim 14 wherein:
said means for further processing: further develops a further composite indication for a further remaining composite group of defects, said further composite indication relating to a measure of the severity of the further composite group of defects; determines whether said further composite indication exceeds a further predetermined level; and still further processes said data with respect to defects in said further remaining composite group of defects when said further composite indication is determined to exceed said further predetermined level.

17. An apparatus in accordance with claim 14 further comprising:
additional means for processing said data to provide a further indication of a particular defect of said composite group when the indication developed for the particular defect by said further processing means fails to exceed said predetermined level, said further indication relating to a measure of the severity of the particular defect.

18. An apparatus in accordance with claim 13 wherein:
said means for processing said data develops shape geometry attributes of the object and the shape geometry attributes are used to develop the indications for each of the defects in said first group and said composite indication.

19. An apparatus in accordance with claim 13 wherein:
said object is a solder joint.

20. An apparatus in accordance with claim 13 further comprising:
means for generating three dimensional data related to the object.

21. An apparatus in accordance with claim 13 wherein:
each said indication comprises a certainty factor.

22. Apparatus in accordance with claim 13 wherein:
said means for processing utilizes, for developing said composite indication, at least a part of the processed data generated in developing the indications for the first group of defects.

* * * * *